(12) United States Patent
Kuo et al.

(10) Patent No.: US 12,111,427 B2
(45) Date of Patent: Oct. 8, 2024

(54) ULTRASONIC DETECTION DEVICE

(71) Applicant: Au Optronics Corporation, Hsinchu (TW)

(72) Inventors: Shyh-Bin Kuo, Hsinchu (TW); Tai-Hsiang Huang, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 633 days.

(21) Appl. No.: 17/406,119

(22) Filed: Aug. 19, 2021

(65) Prior Publication Data

US 2022/0373664 A1 Nov. 24, 2022

(30) Foreign Application Priority Data

May 21, 2021 (TW) .................................. 110118442

(51) Int. Cl.
*G01S 7/52* (2006.01)
*B06B 1/02* (2006.01)
*G01S 15/89* (2006.01)

(52) U.S. Cl.
CPC .......... *G01S 7/5205* (2013.01); *B06B 1/0292* (2013.01); *G01S 7/52004* (2013.01); *G01S 15/8925* (2013.01)

(58) Field of Classification Search
CPC .............. G01S 7/5205; G01S 7/52004; G01S 15/8925; G01S 15/8927; G01S 15/89; G01S 7/521; G01S 15/02; B06B 1/0292; A61B 8/44

See application file for complete search history.

(56) References Cited

U.S. PATENT DOCUMENTS

| 9,310,485 | B2 * | 4/2016 | Degertekin | .......... A61B 8/4494 |
| 2013/0128702 | A1 * | 5/2013 | Degertekin | ............ A61B 8/445 |
| | | | | 367/140 |
| 2022/0373664 | A1 * | 11/2022 | Kuo | .................... G01S 15/8925 |

FOREIGN PATENT DOCUMENTS

| CN | 114063085 A | * | 2/2022 | ............... A61B 8/44 |
| CN | 114063085 B | * | 4/2024 | ............... A61B 8/44 |
| WO | 2018115283 | | 6/2018 | |

* cited by examiner

Primary Examiner — Daniel Pihulic
(74) Attorney, Agent, or Firm — JCIPRNET (57) ABSTRACT

An ultrasonic detection device, including a substrate, sensing elements, a first test element, a first dummy element, at least one first common signal line, sensing signal lines, and at least one test signal line, is provided. The sensing elements, the first test element, and the first dummy element are located on the substrate. The first test element is located between the sensing elements and the first dummy element. Each of the sensing elements, the first test element, and the first dummy element includes an array of capacitive microelectromechanical ultrasonic transducers. The first common signal line is electrically connected to the sensing elements and the first test element. The sensing signal lines are electrically connected to the sensing elements. The test signal line is electrically connected to the first test element.

18 Claims, 9 Drawing Sheets

ULTRASONIC DETECTION DEVICE

CROSS-REFERENCE TO RELATED APPLICATION

This application claims the priority benefit of Taiwan application serial no. 110118442, filed on May 21, 2021. The entirety of the above-mentioned patent application is hereby incorporated by reference herein and made a part of this specification.

BACKGROUND

Technical Field

The disclosure relates to an ultrasonic detection device, and more particularly to an ultrasonic detection device including a first test element.

Description of Related Art

The ultrasonic detection device adopts a technology that obtains images through emitting and receiving ultrasonic waves. In daily life, many apparatuses use ultrasonic detection technology. For example, a car or a drone uses an ultrasonic detection device to measure a distance; and a doctor uses an apparatus with an ultrasonic detection device to check the physical condition of a patient. Currently, common ultrasonic detection devices include a capacitive micromachined ultrasonic transducer (CMUT) and a piezo-electric micromachined ultrasonic transducer (PMUT). The CMUT contains two electrodes, and there is an insulating film between the two electrodes. By controlling the voltage of the electrodes, the insulating film vibrates and emits ultrasonic waves.

SUMMARY

The disclosure provides an ultrasonic detection device, which can improve the issue of poor image quality due to the test process of the ultrasonic detection device.

At least one embodiment of the disclosure provides an ultrasonic detection device. The ultrasonic detection device includes a substrate, multiple sensing elements, a first test element, a first dummy element, at least one first common signal line, multiple sensing signal lines, and a test signal line. The sensing elements, the first test element, and the first dummy element are located on the substrate. The first test element is located between the sensing elements and the first dummy element. Each of the sensing elements, the first test element, and the first dummy element includes an array of multiple capacitive microelectromechanical ultrasonic transducers. The first common signal line is electrically connected to the sensing elements and the first test element. The sensing signal lines are electrically connected to the sensing elements. The test signal line is electrically connected to the first test element.

DETAILED DESCRIPTION OF DISCLOSED EMBODIMENTS

Figure 1A:
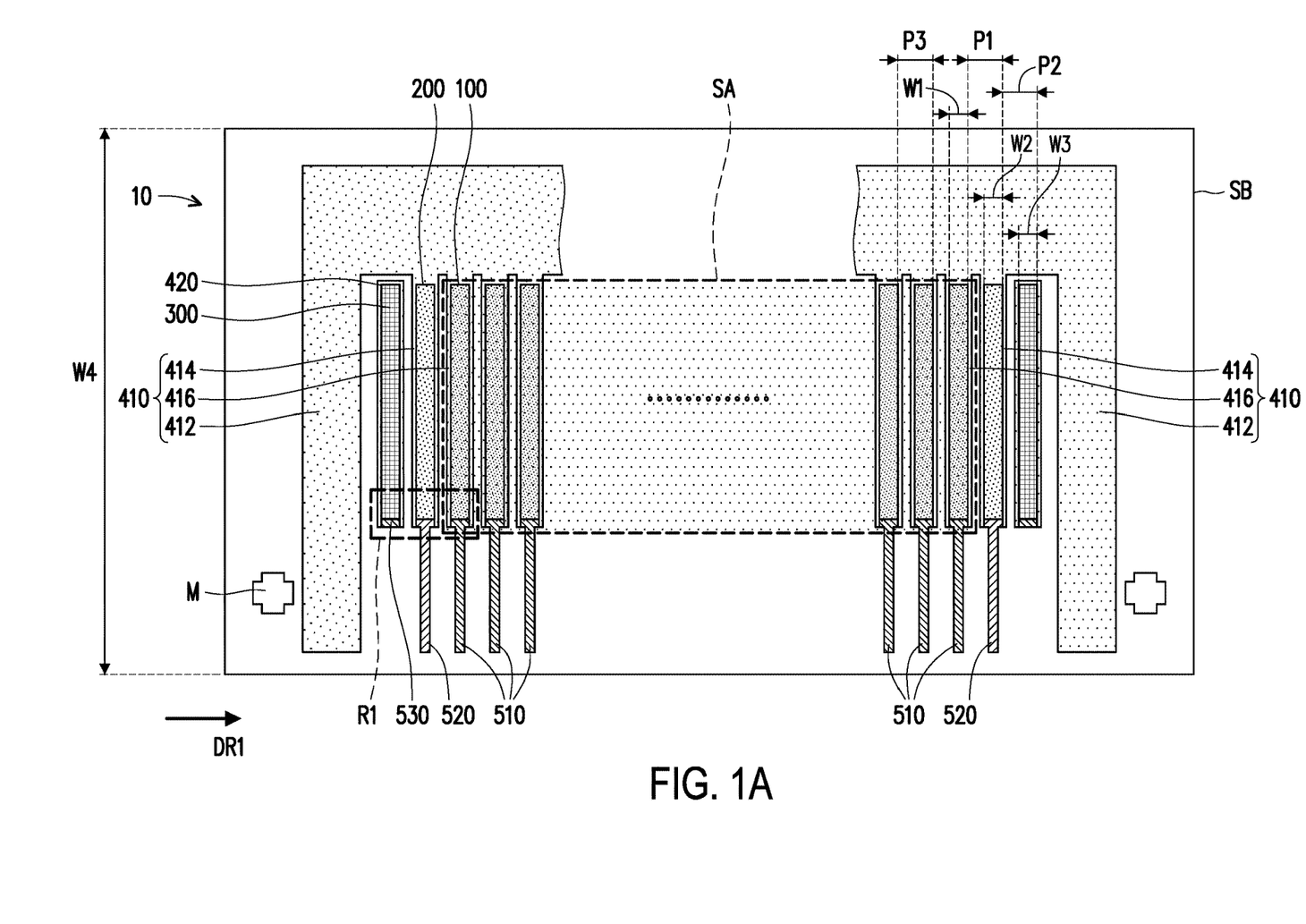
FIG. 1A is a schematic top view of an ultrasonic detection device according to an embodiment of the disclosure.
Figure 1B:
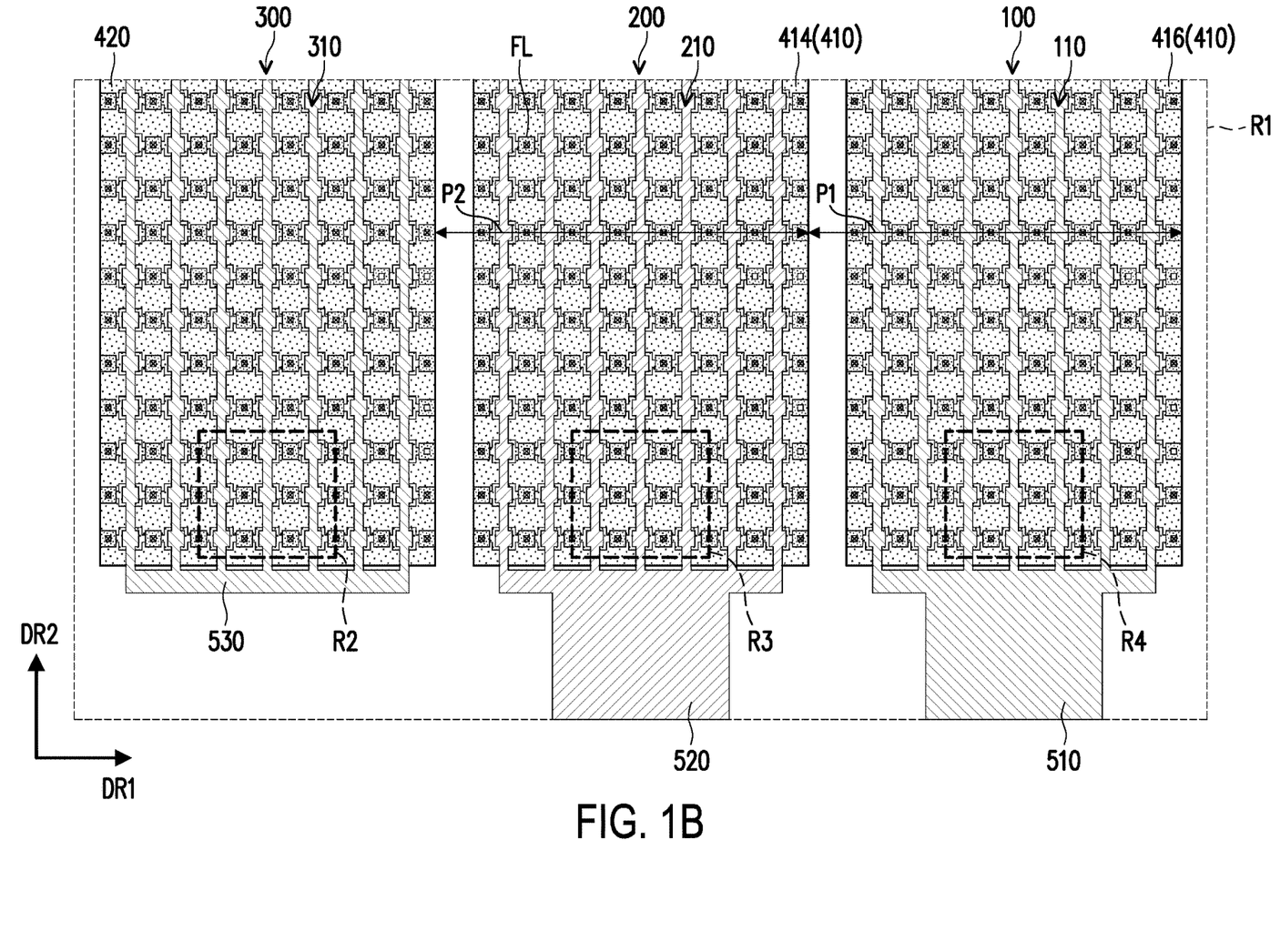
FIG. 1B is a partial enlarged view of the ultrasonic detection device of FIG. 1A.
Figure 1C:
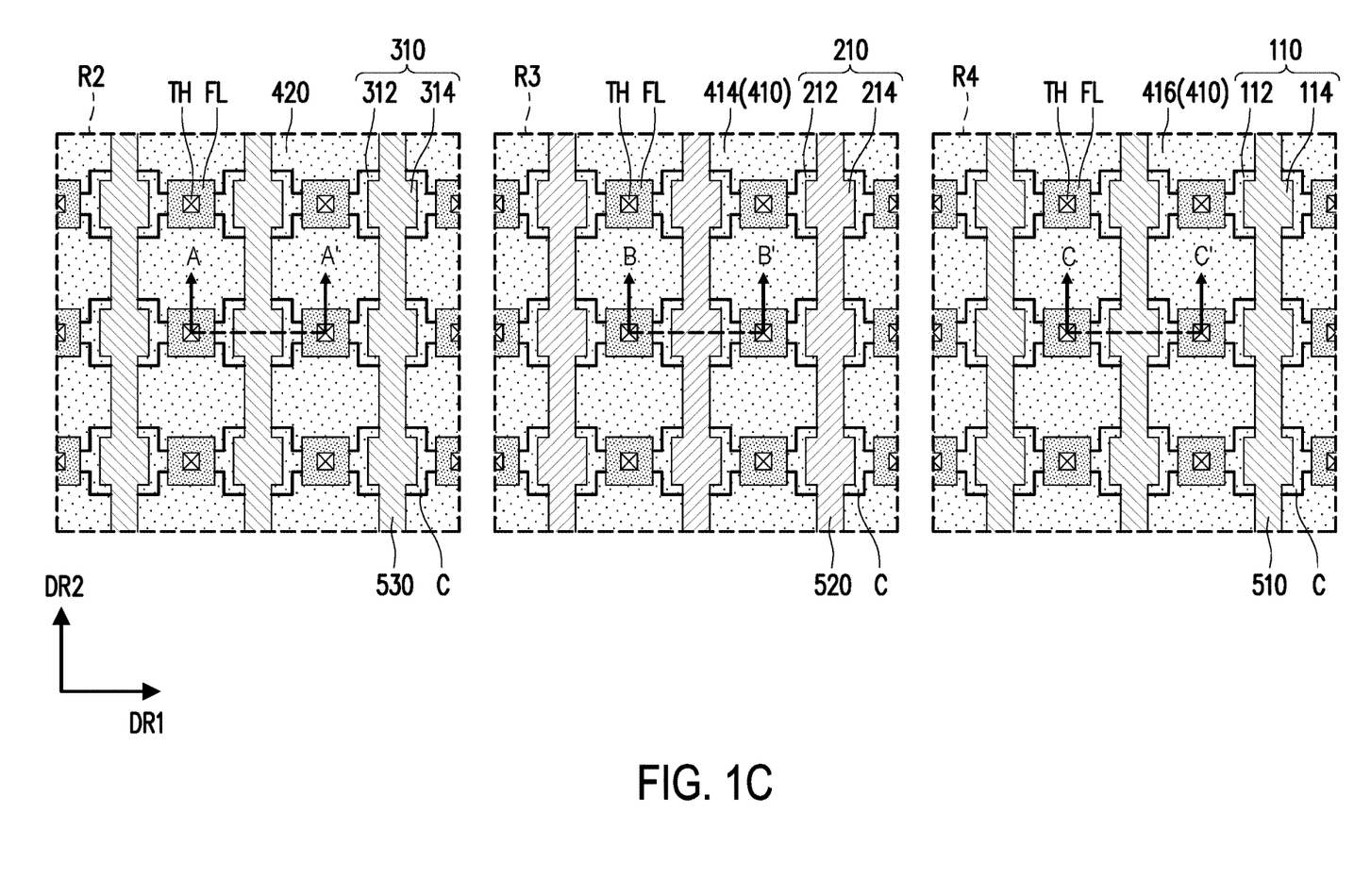
FIG. 1C is a partial enlarged view of the ultrasonic detection device of FIG. 1B.
Figure 2:
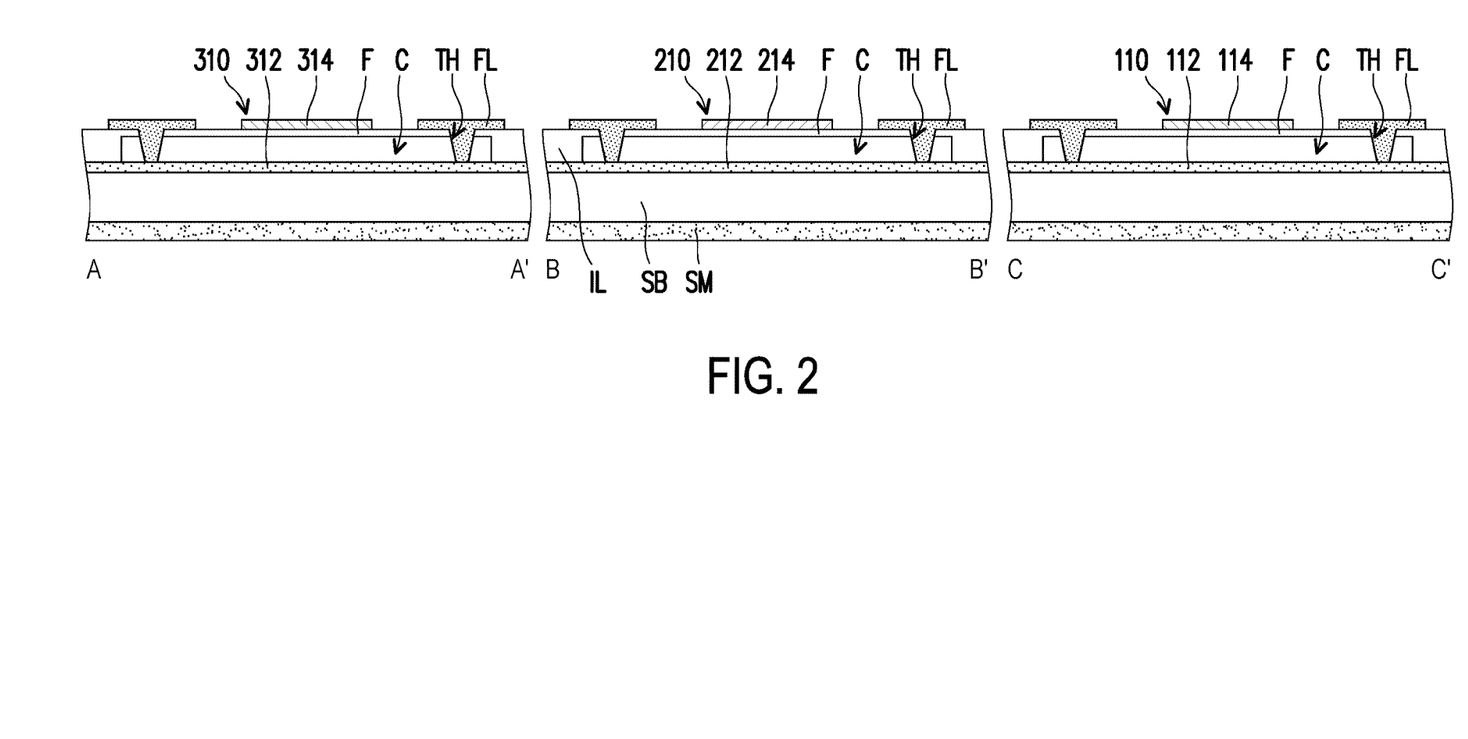
FIG. 2 is a schematic cross-sectional view corresponding to lines A-A', B-B', and C-C' in FIG. 1C.

FIG. 1A is a schematic top view of an ultrasonic detection device 10 according to an embodiment of the disclosure. FIG. 1B is a partial enlarged view of the ultrasonic detection device 10 of FIG. 1A, wherein FIG. 1B corresponds to a position of a region R1 of FIG. 1A. FIG. 1C is a partial enlarged view of the ultrasonic detection device 10 of FIG. 1B, wherein FIG. 1C corresponds to positions of regions R2, R3, and R4 of FIG. 1B. FIG. 2 is a schematic cross-sectional view corresponding to a line A-A' in FIG. 1C.

Please refer to FIG. 1A. The ultrasonic detection device 10 includes a substrate SB, multiple sensing elements 100, one or more first test elements 200, one or more first dummy elements 300, a first common signal line 410, multiple sensing signal lines 510, and one or more test signal lines 520. The ultrasonic detection device 10 has a sensing area SA, wherein the sensing elements 100 are disposed in the sensing area SA, and the first test elements 200 and the first dummy elements 300 are disposed outside the sensing area SA. In the embodiment, the ultrasonic detection device 10 further includes an alignment mark M. The alignment mark M is disposed on the substrate SB and is suitable for improving the accuracy of various manufacturing processes of the ultrasonic detection device 10.

The sensing elements 100, the first test elements 200, and the first dummy elements 300 are located on the substrate SB. The first test elements 200 are located between the sensing elements 100 and the first dummy elements 300. The sensing elements 100, the first test elements 200, and the first dummy elements 300 are arranged in a first direction DR1. In the embodiment, the ultrasonic detection device 10 includes two first test elements 200 and two first dummy elements 300, the sensing element 100 is located between the two first test elements 200, and the sensing elements 100 and the first test elements 200 are located between the two first dummy elements 300. In some embodiments, the ultrasonic detection device 10 includes 64 to 256 sensing elements 100.

Please refer to FIG. 1A and FIG. 1B. Each of the sensing elements 100, the first test elements 200, and the first dummy elements 300 includes an array of multiple capacitive microelectromechanical ultrasonic transducers 110, 210, and 310. In the embodiment, the sensing element 100 includes the capacitive microelectromechanical ultrasonic transducers 110 arranged along the first direction DR1 and a second direction DR2, the first test element 200 includes the capacitive microelectromechanical ultrasonic transducers 210 arranged along the first direction DR1 and the second direction DR2, and the first dummy element 300 includes an array of capacitive microelectromechanical ultrasonic transducers 310 arranged along the first direction DR1 and the second direction DR2. In some embodiments, the first direction DR1 is substantially perpendicular to the second direction DR2.

The number of capacitive microelectromechanical ultrasonic transducers 110, 210, and 310 of each of the sensing elements 100, the first test elements 200, and the first dummy elements 300 are the same as one another. In the embodiment, the arrangement manner and the number of capacitive microelectromechanical ultrasonic transducers 110 in one sensing element 100 are equal to the arrangement manner and the number of capacitive microelectromechanical ultrasonic transducers 210 in one first test element 200, and the arrangement manner and the number of capacitive microelectromechanical ultrasonic transducers 210 in one first test element 200 are equal to the arrangement manner and the number of capacitive microelectromechanical ultrasonic transducers 310 in one first dummy element 300. In other words, the sensing element 100, the first test element 200, and the first dummy element 300 have structures similar to one another.

The first common signal line 410 is electrically connected to the capacitive microelectromechanical ultrasonic transducer 110 of the sensing element 100 and the capacitive microelectromechanical ultrasonic transducer 210 of the first test element 200. In the embodiment, the first common signal line 410 includes a main portion 412, multiple first branch portions 414 overlapping with the first test element 200, and multiple second branch portions 416 overlapping with the sensing element 100. The first branch portions 414 and the second branch portions 416 are connected to one side of the main portion 412. The first branch portions 414 are electrically connected to the first test element 200, and the second branch portions 416 are electrically connected to the sensing element 100.

The sensing signal line 510 is electrically connected to the capacitive microelectromechanical ultrasonic transducer 110 of the sensing element 100. The test signal line 520 is electrically connected to the capacitive microelectromechanical ultrasonic transducer 210 of the first test element 200. In some embodiments, the sensing signal line 510 and the test signal line 520 may be used as bonding pads for connecting chips (not shown). For example, the chips are disposed on the sensing signal line 510 and the test signal line 520 and are electrically connected to the sensing signal line 510 and the test signal line 520. The sensing signal line 510 and the test signal line 520 are electrically connected to the same or different chips.

In the embodiment, the ultrasonic detection device 10 further includes multiple dummy common signal lines 420 and multiple dummy sensing signal lines 530. The dummy common signal line 420 overlaps with the dummy sensing signal line 530. The dummy common signal line 420 and the dummy sensing signal line 530 are electrically connected to the capacitive microelectromechanical ultrasonic transducer 310 of the first dummy element 300. In the embodiment, the dummy common signal line 420, the first branch portion 414, and the second branch portion 416 are substantially parallel to one another. In the embodiment, the dummy common signal line 420, the first branch portion 414, and the second branch portion 416 are substantially parallel to the second direction DR2.

Please refer to FIG. 1C and FIG. 2. In the embodiment, the capacitive microelectromechanical ultrasonic transducers 110, 210, and 310 have similar structures. Each of the capacitive microelectromechanical ultrasonic transducers 110, 210, and 310 includes a first electrode and a second electrode separated from the first electrode.

In the embodiment, a first electrode 112 of the capacitive microelectromechanical ultrasonic transducer 110 of the sensing element 100, a first electrode 212 of the capacitive microelectromechanical ultrasonic transducer 210 of the first test element 200, a first electrode 312 of the capacitive microelectromechanical ultrasonic transducer 310 of the first dummy element 300, the first common signal line 410, and the dummy common signal line 420 are disposed on the substrate SB. The first electrode 112, the first electrode 212, and the first electrode 312 are connected to the first common signal line 410, and the first electrode 312 is connected to the dummy common signal line 420. In the embodiment, the chips or other driving circuits (not shown) are electrically connected to the first common signal line 410 and provide voltage to the first common signal line 410. The dummy common signal line 420 does not directly receive signals provided by the chips or other driving circuits. Therefore, the first electrode 312 is a floating electrode.

In some embodiments, the first electrode 112, the first electrode 212, the first electrode 312, the first common signal line 410, and the dummy common signal line 420 belong to the same conductive film layer. For example, the first electrode 112, the first electrode 212, the first electrode 312, the first common signal line 410, and the dummy common signal line 420 are formed by patterning the same layer of conductive material. In the embodiment, the first electrode 112, the first electrode 212, the first electrode 312, the first common signal line 410, and the dummy common signal line 420 have a single-layer or multi-layer (for example, a titanium layer, an aluminum layer, and a stacked layer of titanium layers) structure, and the materials of the first electrode 112, the first electrode 212, the first electrode 312, the first common signal line 410, and the dummy common signal line 420 include metals, nitrides of metallic materials, oxides of metallic materials, oxynitrides of metallic materials, other suitable materials, or stacked layers of metallic materials and other conductive materials. In the embodiment, the first electrode 112 of the capacitive microelectromechanical ultrasonic transducer 110 of the sensing element 100, the first electrode 212 of the capacitive microelectromechanical ultrasonic transducer 210 of the first test element 200, and the first common signal line 410 are connected as one. In the embodiment, the first electrode 312 of the capacitive microelectromechanical ultrasonic transducer 310 of the first dummy element 300 and the dummy common signal line 420 are connected as one.

An insulating layer IL is located on the first electrodes 112, 212, and 312, the first common signal line 410, and the dummy common signal line 420. In the embodiment, the insulating layer IL has multiple grooves C, and each groove C overlaps with multiple corresponding capacitive microelectromechanical ultrasonic transducers 110, 210, and 310. In the embodiment, the grooves C extend along the first direction DR1.

A part of the insulating layer IL is located on top of the grooves C and constitutes a thin film F. Multiple through holes TH pass through the thin film F. A filling material FL is located on the insulating layer IL and is filled into the through holes TH, thereby sealing the grooves C. The filling material FL includes, for example, cured photoresist, silicon-containing nitride, silicon-containing oxide, or other insulating materials.

In the embodiment, a second electrode 114 of the capacitive microelectromechanical ultrasonic transducer 110 of the sensing element 100, a second electrode 214 of the capacitive microelectromechanical ultrasonic transducer 210 of the first test element 200, a second electrode 314 of the capacitive microelectromechanical ultrasonic transducer 310 of the first dummy element 300, the sensing signal line 510, the test signal line 520, and the dummy sensing signal line 530 are disposed on the insulating layer IL. The second electrode 114 is electrically connected to the sensing signal line 510, the second electrode 214 is electrically connected to the test signal line 520, and the second electrode 314 is connected to the dummy sensing signal line 530. In the embodiment, the chips or other driving circuits (not shown) are electrically connected to the sensing signal line 510 and the test signal line 520, and provide voltage to the sensing signal line 510 and the test signal line 520. The dummy sensing signal line 530 does not directly receive signals provided by the chips or other driving circuits. Therefore, the second electrode 314 is a floating electrode.

In some embodiments, the second electrode 114, the second electrode 214, the second electrode 314, the sensing signal line 510, the test signal line 520, and the dummy sensing signal line 530 belong to the same conductive film layer. For example, the second electrode 114, the second electrode 214, the second electrode 314, the sensing signal line 510, the test signal line 520, and the dummy sensing signal line 530 are formed by patterning the same layer of conductive material. In the embodiment, the second electrode 114, the second electrode 214, the second electrode 314, the sensing signal line 510, the test signal line 520, and the dummy sensing signal line 530 have a single-layer or multi-layer (such as a molybdenum layer, an aluminum layer, and a stacked layer of molybdenum layers) structure, and the materials of the second electrode 114, the second electrode 214, the second electrode 314, the sensing signal line 510, the test signal line 520, and the dummy sensing signal line 530 include metals, nitrides of metallic materials, oxides of metallic materials, oxynitrides of metallic materials, other suitable materials, or stacked layers of metallic materials and other conductive materials. In the embodiment, the second electrodes 114 of the capacitive microelectromechanical ultrasonic transducer 110 of the sensing element 100 are respectively connected as one with the corresponding sensing signal lines 510, the second electrodes 214 of the capacitive microelectromechanical ultrasonic transducer 210 of the first test element 200 are respectively connected as one with the corresponding test signal lines 520, and the second electrodes 314 of the capacitive microelectromechanical ultrasonic transducer 310 of the first dummy element 300 are respectively connected as one with the corresponding dummy sensing signal lines 530.

In some embodiments, the ultrasonic detection device 10 further includes a shock-absorbing material SM. The shock-absorbing material SM is disposed on a back surface of the substrate SB, and the sensing element 100, the first test element 200 and the first dummy element 300 are disposed on a front surface of the substrate SB.

Please refer to FIG. 1A and FIG. 1B. In the embodiment, the first test element 200 is suitable for testing the breakdown voltage of the ultrasonic detection device 10. For example, a test process is executed on the ultrasonic detection device 10, wherein the test process is, for example, an impedance test or an acoustic test. During the test process, voltage is repeatedly applied to the first test element 200 until the first test element 200 collapses.

In some embodiments, the sensing elements 100 in the sensing area SA affect one another. For example, in the sensing area SA, the performance of each sensing element 100 is affected by the adjacent sensing element 100 or the first test element 200. Therefore, in order for the first test element 200 to have the performance similar to the sensing elements 100, the first dummy element 300 is disposed such that the first test element 200 is located between the first dummy element 300 and the sensing elements 100. In other words, by the configuration of the first dummy element 300, the performance of the first test element 200 may be closer to the performance of the sensing elements 100 in the sensing area SA, thereby improving the reliability of the test process. In some embodiments, through the test process, a part or all of the capacitive microelectromechanical ultrasonic transducers 210 in the first test element 200 collapse after repeatedly applying voltage. Since the first test element 200 is disposed outside the sensing area SA, even if the first test element 200 collapses, an image generated by the sensing elements 100 in the sensing area SA will not be greatly affected. In other words, the quality of the image displayed by the ultrasonic detection device 10 may be maintained by sacrificing the first test element 200.

Please refer to FIG. 1A and FIG. 1B. In the embodiment, a pitch P1 between the first test element 200 and the adjacent sensing element 100 is approximately equal to a pitch P2 between the first test element 200 and the first dummy element 300, and the pitch P1 between the first test element 200 and the adjacent sensing element 100 is equal to a pitch P3 between two adjacent sensing elements 100. In some embodiments, the pitch P1, the pitch P2, and the pitch P3 are, for example, 0.1 mm to 1 mm.

In some embodiments, a width W1 of the sensing element 100, a width W2 of the first test element 200, and a width W3 of the first dummy element 300 are the same as one another. In some embodiments, a center frequency of an ultrasonic wave emitted by the ultrasonic detection device 10 is 0.2 MHz to 20 MHz. In some embodiments, a width W4 of the ultrasonic detection device 10 is 2 mm to 200 mm.

Figure 3:
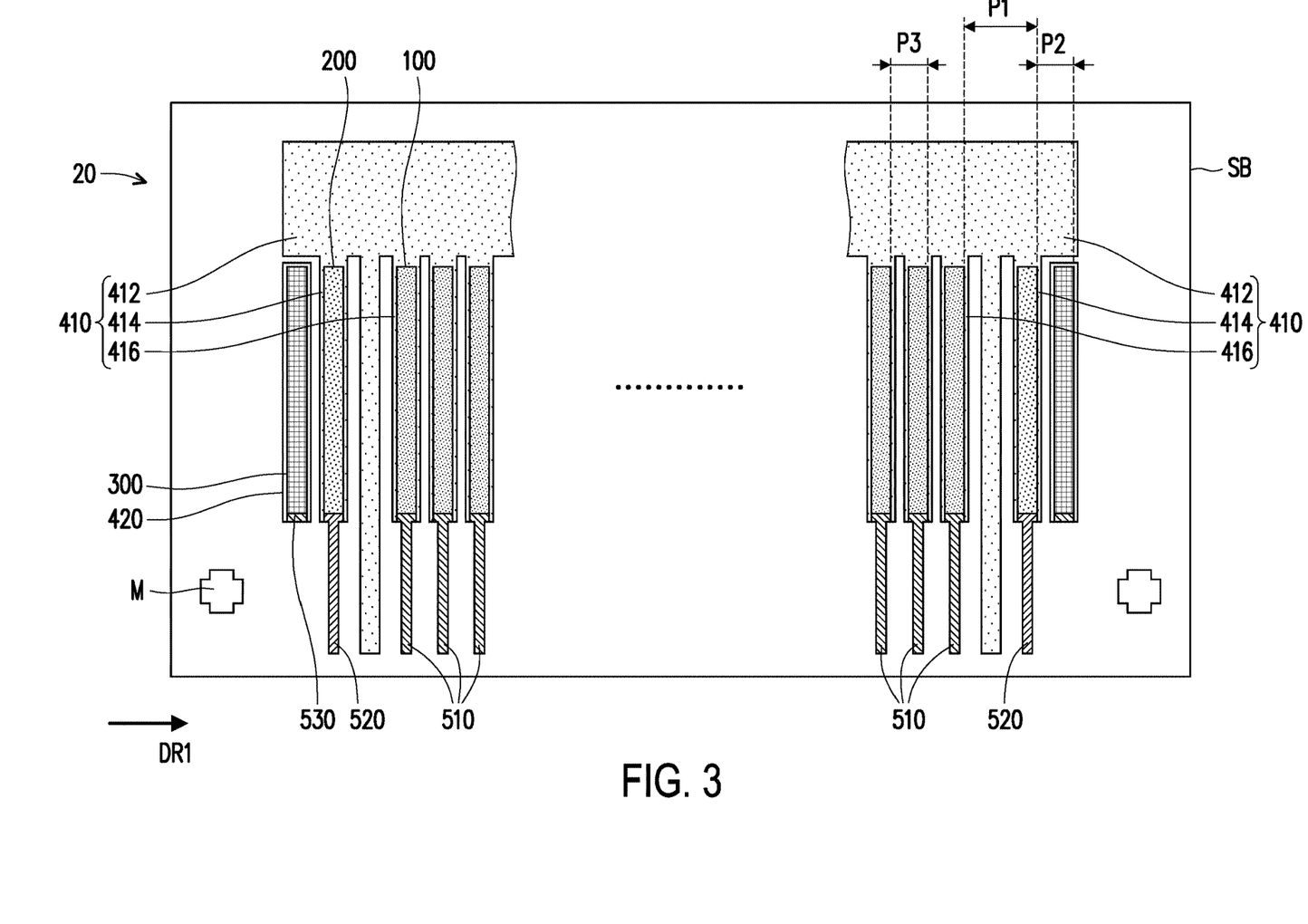
FIG. 3 is a schematic top view of an ultrasonic detection device according to an embodiment of the disclosure.

FIG. 3 is a schematic top view of an ultrasonic detection device 20 according to an embodiment of the disclosure. It must be noted here that the embodiment of FIG. 3 continues to use the reference numerals and some content of the embodiment of FIG. 1A to FIG. 2, wherein the same or similar reference numerals are adopted to represent the same or similar elements, and the description of the same technical content is omitted. For the description of the omitted parts, please refer to the foregoing embodiment, which will not be repeated here.

The difference between the ultrasonic detection device 20 of FIG. 3 and the ultrasonic detection device 10 of FIG. 1A is that: in the ultrasonic detection device 20, a part of the first common signal line 410 is disposed between the sensing element 100 and the first test element 200.

Please refer to FIG. 3. In the embodiment, the pitch P1 between the first test element 200 and the adjacent sensing element 100 is greater than the pitch P2 between the first test element 200 and the first dummy element 300, and the pitch P1 between the first test element 200 and the adjacent sensing element 100 is greater than the pitch P3 between two adjacent sensing elements 100.

Figure 4:
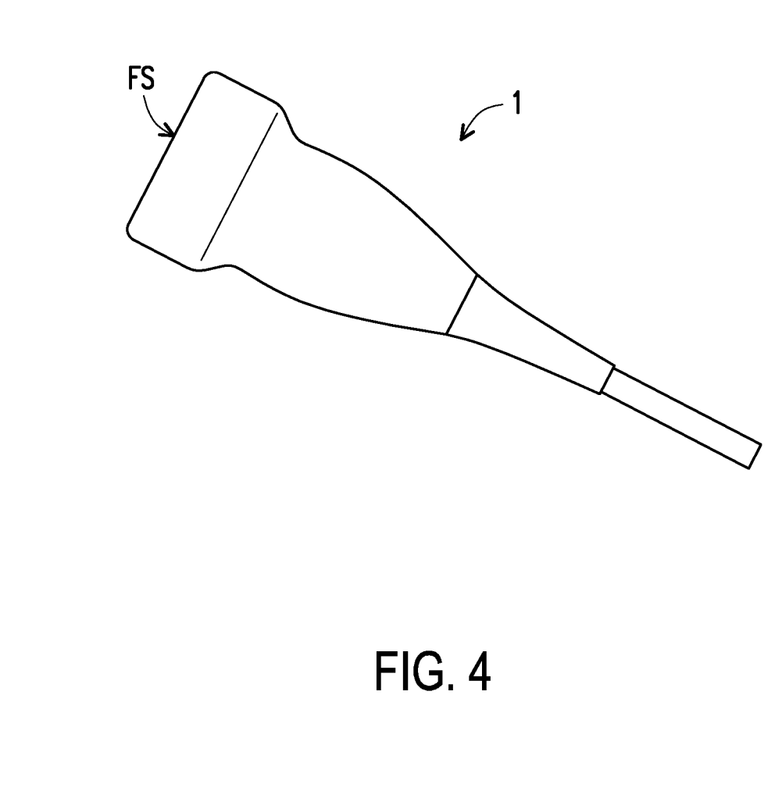
FIG. 4 is a schematic side view of an ultrasonic detection apparatus according to an embodiment of the disclosure.

FIG. 4 is a schematic side view of an ultrasonic detection apparatus 1 according to an embodiment of the disclosure. It must be noted here that the embodiment of FIG. 4 continues to use the reference numerals and some content of the embodiment of FIG. 1A to FIG. 2, wherein the same or similar reference numerals are adopted to represent the same or similar elements, and the description of the same technical content is omitted. For the description of the omitted parts, please refer to the foregoing embodiment, which will not be repeated here.

Please refer to FIG. 4. In the embodiment, an ultrasonic detection device (such as the ultrasonic detection device 10 of FIG. 1A) is disposed on a front surface FS of the ultrasonic detection apparatus 1. In the embodiment, the front surface FS of the ultrasonic detection apparatus 1 is a flat surface. Therefore, a substrate of the ultrasonic detection device is a flat substrate.

Figure 5:
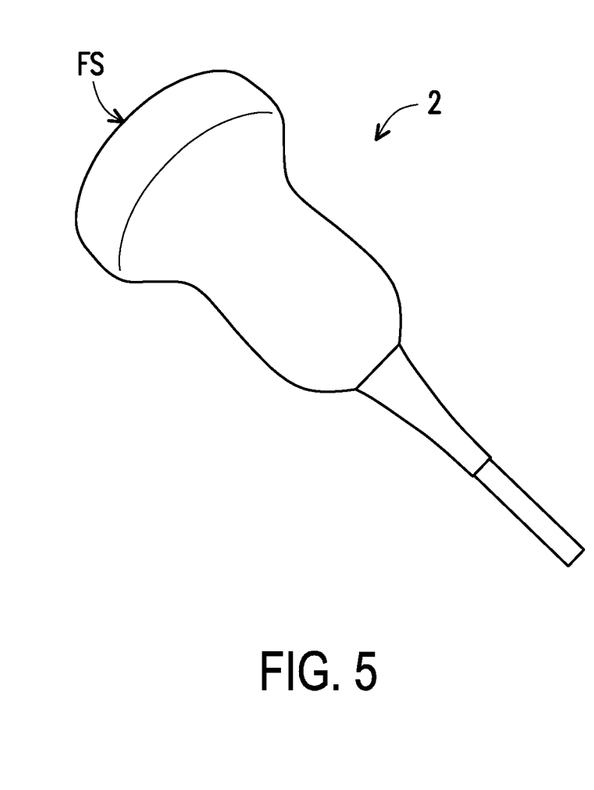
FIG. 5 is a schematic side view of an ultrasonic detection apparatus according to an embodiment of the disclosure.

FIG. 5 is a schematic side view of an ultrasonic detection apparatus 2 according to an embodiment of the disclosure. It must be noted here that the embodiment of FIG. 5 continues to use the reference numerals and some content of the embodiment of FIG. 1A to FIG. 2, wherein the same or similar reference numerals are adopted to represent the same or similar elements, and the description of the same technical content is omitted. For the description of the omitted parts, please refer to the foregoing embodiment, which will not be repeated here.

Please refer to FIG. 5. In the embodiment, an ultrasonic detection device (such as the ultrasonic detection device 10 of FIG. 1A) is disposed on the front surface FS of the ultrasonic detection apparatus 2. In the embodiment, the front surface FS of the ultrasonic detection apparatus 2 is a curved surface. Therefore, a substrate of the ultrasonic detection device includes a curved surface, and the sensing element, the first test element, and the first dummy element are located on the curved surface. In the embodiment, the substrate of the ultrasonic detection device is, for example, a soft substrate.

Figure 6A:
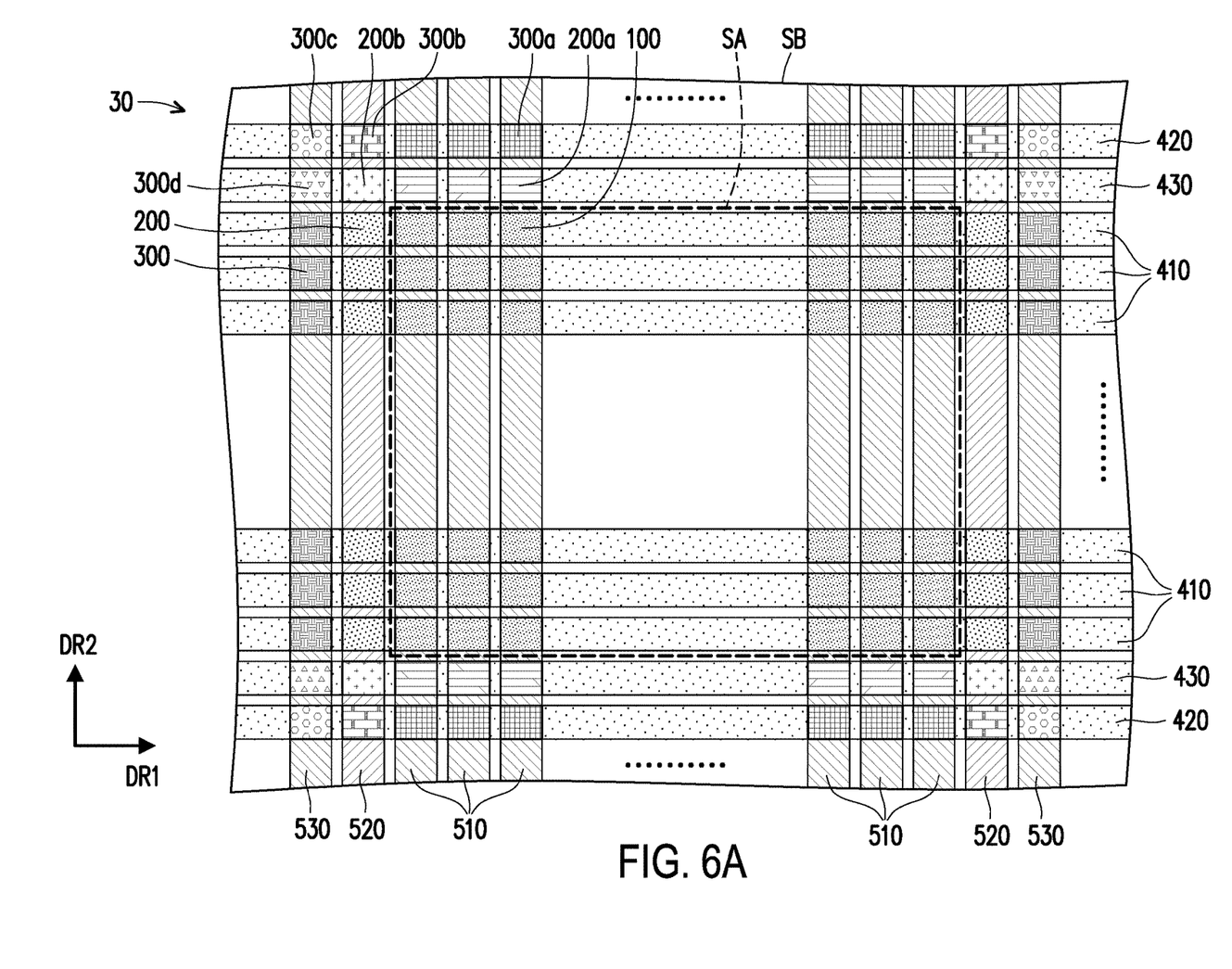
FIG. 6A is a schematic top view of an ultrasonic detection device according to an embodiment of the disclosure.
Figure 6B:
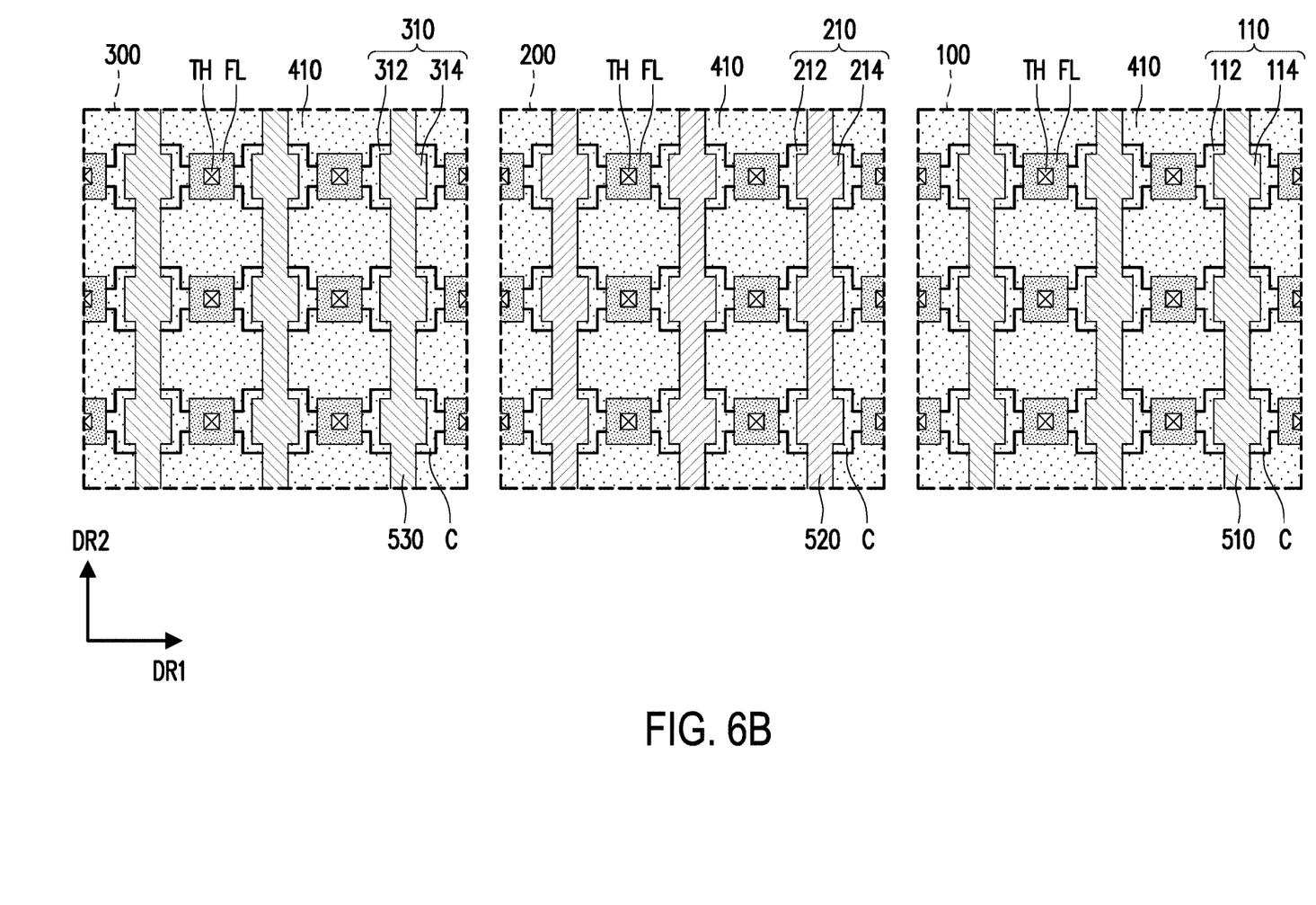
FIG. 6B is a partial enlarged view of the ultrasonic detection device of FIG. 6A.

FIG. 6A is a schematic top view of an ultrasonic detection device 30 according to an embodiment of the disclosure. FIG. 6B is a partial enlarged view of the ultrasonic detection device 30 of FIG. 6A, wherein FIG. 6B corresponds to the positions of the sensing element 100, the first test element 200, and the first dummy element 300 of FIG. 6A.

It must be noted here that the embodiment of FIG. 6A and FIG. 6B continues to use the reference numerals and some content of the embodiment of FIG. 1A to FIG. 2, wherein the same or similar reference numerals are adopted to represent the same or similar elements, and the description of the same technical content is omitted. For the description of the omitted parts, please refer to the foregoing embodiment, which will not be repeated here.

Please refer to FIG. 6A and FIG. 6B. In the embodiment, the ultrasonic detection device 30 includes a substrate SB, multiple sensing elements 100, multiple first test elements 200, multiple first dummy elements 300, multiple first common signal lines 410, multiple sensing signal lines 510, and multiple test signal lines 520. The ultrasonic detection device 30 has a sensing area SA, wherein the sensing elements 100 are disposed in the sensing area SA, and the first test elements 200 and the first dummy elements 300 are disposed outside the sensing area SA.

The sensing elements 100, the first test elements 200, and the first dummy elements 300 are located on the substrate SB. The first test elements 200 are located between the sensing elements 100 and the first dummy elements 300.

The first common signal lines 410 extend along a first direction DR1. The first common signal lines 410 are electrically connected to the sensing elements 100, the first test elements 200, and the first dummy elements 300. Each of the first common signal lines 410 is electrically connected to two corresponding first test elements 200, two corresponding first dummy elements 300, and multiple sensing elements 100 located between the two corresponding first test elements 200 in the first direction DR1.

The sensing signal lines 510 extend along a second direction DR2. The sensing signal lines 510 are electrically connected to the sensing elements 100. In the embodiment, the ultrasonic detection device 30 further includes multiple second test elements 200a and multiple second dummy elements 300a. Each of the sensing signal lines 510 is electrically connected to two corresponding second test elements 200a, two corresponding second dummy elements 300a, and multiple sensing elements 100 located between the two corresponding second test elements 200a in the second direction DR2.

The test signal lines 520 extend along the second direction DR2. The test signal lines 520 are electrically connected to the first test elements 200. In the embodiment, the ultrasonic detection device 30 further includes multiple third test elements 200b and multiple third dummy elements 300b. Each of the test signal lines 520 is electrically connected to two corresponding third test elements 200b, two corresponding third dummy elements 300b, and multiple first test elements 200 located between the two corresponding third test elements 200b in the second direction DR2.

The dummy sensing signal lines 530 extend along the second direction DR2. The dummy sensing signal lines 530 are electrically connected to the first dummy elements 300. In the embodiment, the ultrasonic detection device 30 further includes multiple fourth dummy elements 300c and multiple fifth dummy elements 300d. Each of the dummy sensing signal lines 530 is electrically connected to two corresponding fourth dummy elements 300c, two corresponding fifth dummy elements 300d, and multiple first dummy elements 300 located between the two corresponding fifth dummy elements 300d in the second direction DR2. In the embodiment, the test signal lines 520 are located between the sensing signal lines 510 and the dummy sensing signal lines 530.

In the embodiment, the ultrasonic detection device 30 further includes multiple dummy common signal lines 420 and multiple test common signal lines 430. The dummy common signal lines 420 and the test common signal lines 430 extend along the first direction DR1.

The dummy common signal lines 420 are electrically connected to the second dummy elements 300a, the third dummy elements 300b, and the fourth dummy elements 300c. Each of the dummy common signal lines 420 is electrically connected to two corresponding third dummy elements 300b, two corresponding fourth dummy elements 300c, and multiple second dummy elements 300a located between the two corresponding third dummy elements 300b in the first direction DR1.

The test common signal lines 430 are electrically connected to the second test elements 200a, the third test elements 200b, and the fifth dummy elements 300d. Each of the test common signal lines 430 is electrically connected to two corresponding third test elements 200b, two corresponding fifth dummy elements 300d, and multiple second test elements 200a located between the two corresponding third test elements 200b in the first direction DR1.

In the embodiment, the sensing element 100, the first test element 200, the second test element 200a, the third test element 200b, the first dummy element 300, the second dummy element 300a, the third dummy element 300b, the fourth dummy element 300c, and the fifth dummy element 300d have structures similar to one another. In FIG. 6B, the structures of the sensing element 100, the first test element 200, and the first dummy element 300 are exemplified for description.

In the embodiment, each of the sensing elements 100, the first test elements 200, the second test elements 200a, the third test elements 200b, the first dummy elements 300, the second dummy elements 300a, the third dummy elements 300b, the fourth dummy elements 300c, and the fifth dummy elements 300d includes an array of capacitive microelectromechanical ultrasonic transducers, wherein 6B shows the capacitive microelectromechanical ultrasonic transducers 110 of the sensing element 100, the capacitive microelectromechanical ultrasonic transducers 210 of the first test element 200, and the capacitive microelectromechanical ultrasonic transducers 310 of the first dummy element 300.

In the embodiment, the dummy common signal line 420 and the dummy sensing signal line 530 do not directly receive signals provided by the chips or other driving circuits. Therefore, first electrodes and second electrodes of the capacitive microelectromechanical ultrasonic transducers of the first dummy element 300, the second dummy element 300a, the third dummy element 300b, the fourth dummy element 300c, and the fifth dummy element 300d are floating electrodes.

In the embodiment, by the configuration of the first dummy element 300, the second dummy element 300a, the third dummy element 300b, the fourth dummy element 300c, and the fifth dummy element 300d, the performance of the first test element 200, the second test element 200a, and the third test element 200b may be closer to the performance of the sensing element 100, thereby improving the reliability of the test process. In some embodiments, through the test process, a part or all of the capacitive microelectromechanical ultrasonic transducers in the first test element 200, the second test element 200a, and the third test element 200b collapse after repeatedly applying voltage. Since the first test element 200, the second test element 200a, and the third test element 200b are disposed outside the sensing area SA, even if the first test element 200, the second test element 200a, and the third test element 200b collapse, an image generated by the sensing elements 100 in the sensing area SA will not be greatly affected. In other words, the quality of the image displayed by the ultrasonic detection device 30 may be maintained by sacrificing the first test element 200, the second test element 200a, and the third test element 200b.

Figure 7:
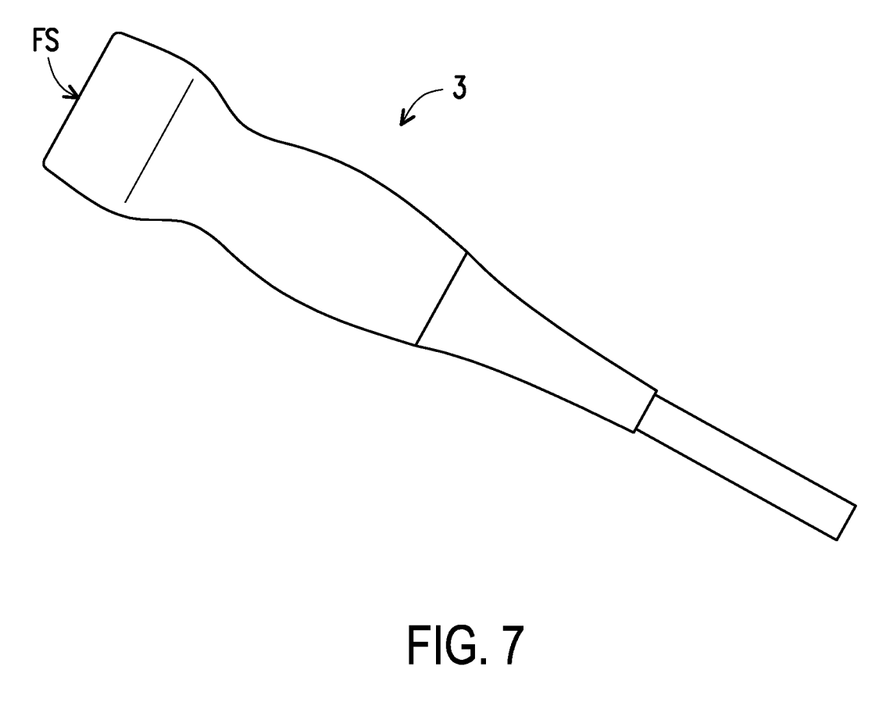
FIG. 7 is a schematic side view of an ultrasonic detection apparatus according to an embodiment of the disclosure.

FIG. 7 is a schematic side view of an ultrasonic detection apparatus 3 according to an embodiment of the disclosure. It must be noted here that the embodiment of FIG. 7 continues to use the reference numerals and some content of the embodiment of FIG. 6A and FIG. 6B, wherein the same or similar reference numerals are adopted to represent the same or similar elements, and the description of the same technical content is omitted. For the description of the omitted parts, please refer to the foregoing embodiment, which will not be repeated here.

Please refer to FIG. 7. In the embodiment, an ultrasonic detection device (such as the ultrasonic detection device 30 of FIG. 6A) is disposed on the front surface FS of the ultrasonic detection apparatus 3. In some embodiments, the front surface FS of the ultrasonic detection apparatus 3 is a surface close to a square.

What is claimed is:

1. An ultrasonic detection device, comprising:
a substrate;
a plurality of sensing elements, a plurality of first test elements, and a plurality of first dummy elements, located on the substrate, wherein the first test elements are located between the sensing elements and the first dummy elements, and each of the sensing elements, the first test elements, and the first dummy elements comprises an array of capacitive microelectromechanical ultrasonic transducers, wherein the sensing elements are located between the first test elements, wherein the sensing elements and the first test elements are located between the first dummy elements;
at least one first common signal line, electrically connected to the sensing elements and the first test elements;
a plurality of sensing signal lines, electrically connected to the sensing elements; and
at least one test signal line, electrically connected to the first test elements.

2. The ultrasonic detection device according to claim 1, further comprising:
a shock-absorbing material, disposed on a back surface of the substrate, wherein the sensing elements are disposed on a front surface of the substrate.

3. The ultrasonic detection device according to claim 1, wherein numbers of the capacitive microelectromechanical ultrasonic transducers of each of the sensing elements, the first test elements, and the first dummy elements are same as one another.

4. The ultrasonic detection device according to claim 1, wherein the at least one first common signal line comprises:
a main portion; and
a plurality of first branch portions and a plurality of second branch portions, connected to one side of the main portion, wherein the first branch portions are electrically connected to the first test elements, and the second branch portions are electrically connected to the sensing elements.

5. The ultrasonic detection device according to claim 1, further comprising:
a plurality of test signal lines, electrically connected to the first test elements.

6. The ultrasonic detection device according to claim 1, further comprising:
a plurality of dummy common signal lines and a plurality of dummy sensing signal lines, electrically connected to the first dummy elements, wherein the dummy common signal lines overlap with the dummy sensing signal lines.

7. The ultrasonic detection device according to claim 1, wherein a pitch between one of the first test elements and adjacent one of the sensing elements is approximately equal to or greater than a pitch between the one of the first test elements and adjacent one of the first dummy elements.

8. An ultrasonic detection device, comprising:
a substrate;
a plurality of sensing elements, at least one first test element, and at least one first dummy element, located on the substrate, wherein the at least one first test element is located between the sensing elements and the at least one first dummy element, and each of the sensing elements, the at least one first test element, and the at least one first dummy element comprises an array of capacitive microelectromechanical ultrasonic transducers;
at least one first common signal line, electrically connected to the sensing elements and the at least one first test element;
a plurality of sensing signal lines, electrically connected to the sensing elements; and at least one test signal line, electrically connected to the at least one first test element, wherein the sensing elements, the at least one first test element, and the at least one first dummy element are arranged in a first direction.

9. The ultrasonic detection device according to claim 1, wherein each of the capacitive microelectromechanical ultrasonic transducers comprises a first electrode and a second electrode separated from the first electrode, and the first electrodes of the capacitive microelectromechanical ultrasonic transducers of the first dummy elements are floating electrodes.

10. The ultrasonic detection device according to claim 9, wherein the second electrodes of the capacitive microelectromechanical ultrasonic transducers of the first dummy elements are floating electrodes.

11. The ultrasonic detection device according to claim 9, wherein the first electrodes of the capacitive microelectromechanical ultrasonic transducers of the sensing elements, the first electrodes of the capacitive microelectromechanical ultrasonic transducers of the first test elements, and the at least one first common signal line are connected as one.

12. The ultrasonic detection device according to claim 9, wherein the second electrodes of the capacitive microelectromechanical ultrasonic transducers of one of the sensing elements are integrated with a corresponding one of the sensing signal lines.

13. The ultrasonic detection device according to claim 9, further comprising:
an insulating layer, located on the first electrodes and the at least one first common signal line, wherein the insulating layer has a plurality of grooves, and each of the grooves overlaps with a plurality of corresponding capacitive microelectromechanical ultrasonic transducers.

14. The ultrasonic detection device according to claim 1, wherein the substrate comprises a curved surface, and the sensing elements, the first test elements, and the first dummy elements are located on the curved surface.

15. An ultrasonic detection device, comprising:
a substrate;
a plurality of sensing elements, at least one first test element, and at least one first dummy element, located on the substrate, wherein the at least one first test element is located between the sensing elements and the at least one first dummy element, and each of the sensing elements, the at least one first test element, and the at least one first dummy element comprises an array of capacitive microelectromechanical ultrasonic transducers, wherein the at least one first test element comprises a capacitive microelectromechanical ultrasonic transducer that collapses after a test process;
at least one first common signal line, electrically connected to the sensing elements and the at least one first test element;
a plurality of sensing signal lines, electrically connected to the sensing elements; and
at least one test signal line, electrically connected to the at least one first test element.

16. The ultrasonic detection device according to claim 1, wherein the number of the at least one first common signal line is plural, wherein each of the first common signal lines extending along a first direction is electrically connected to corresponding two of the first test elements, corresponding two of the first dummy elements, and corresponding ones of the sensing elements located between the corresponding two of the first test elements in the first direction.

17. The ultrasonic detection device according to claim 16, further comprising:
a plurality of second test elements and a plurality of second dummy elements, located on the substrate, wherein the sensing signal lines extend along a second direction, and each of the sensing signal lines is electrically connected to corresponding two of the second test elements, corresponding two of the second dummy elements, and corresponding other ones of the sensing elements located between the corresponding two of the second test elements in the second direction;
a plurality of third test elements, a plurality of third dummy elements, a plurality of fourth dummy elements, and a plurality of fifth dummy elements, located on the substrate;
a plurality of test signal lines, extending along the second direction, wherein each of the test signal lines is electrically connected to corresponding two of the third test elements, corresponding two of the third dummy elements, and corresponding ones of the first test elements located between the corresponding two of the third test elements in the second direction; and
a plurality of dummy sensing signal lines, extending along the second direction, wherein each of the dummy sensing signal lines is electrically connected to corresponding two of the fourth dummy elements, corresponding two of the fifth dummy elements, and corresponding ones of the first dummy elements located between the corresponding two of the fifth dummy elements in the second direction, and the test signal lines are located between the sensing signal lines and the dummy sensing signal lines.

18. The ultrasonic detection device according to claim 17, further comprising:
a plurality of dummy common signal lines, extending along the first direction, wherein each of the dummy common signal lines is electrically connected to corresponding other two of the third dummy elements, corresponding other two of the fourth dummy elements, and corresponding ones of the second dummy elements located between the corresponding other two of the third dummy elements in the first direction; and
a plurality of test common signal lines, extending along the first direction, wherein each of the test common signal lines is electrically connected to corresponding other two of the third test elements, corresponding other two of the fifth dummy elements, and corresponding ones of the second test elements located between the corresponding other two of the third test elements in the first direction.

* * * * *